(12) United States Patent
Reasoner et al.

(10) Patent No.: US 6,757,764 B2
(45) Date of Patent: Jun. 29, 2004

(54) METHOD AND APPARATUS FOR TRANSFERRING INFORMATION USING A CONSTANT FREQUENCY

(75) Inventors: Kelly J. Reasoner, Fort Collins, CO (US); Duane L. Harmon, Loveland, CO (US); Michael J. Chaloner, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 561 days.

(21) Appl. No.: 09/836,986

(22) Filed: Apr. 18, 2001

(65) Prior Publication Data

US 2003/0023796 A1 Jan. 30, 2003

(51) Int. Cl.[7] ............................................... G06F 13/42
(52) U.S. Cl. ..................... 710/106; 710/105; 710/70; 375/222
(58) Field of Search ................................ 710/105–106, 710/104, 60–61, 314–315, 65, 70; 375/222–223, 283

(56) References Cited

U.S. PATENT DOCUMENTS

| | | | | |
|---|---|---|---|---|
| 3,772,680 A | * | 11/1973 | Kawai et al. | 714/801 |
| 3,832,637 A | * | 8/1974 | Alexander et al. | 375/223 |
| 3,927,259 A | * | 12/1975 | Brown | 340/657 |
| 4,052,558 A | * | 10/1977 | Patterson | 375/283 |
| 4,335,464 A | * | 6/1982 | Armstrong | 375/43 |
| 4,773,031 A | * | 9/1988 | Tobin | 708/103 |
| 4,901,333 A | * | 2/1990 | Hodgkiss | 375/98 |
| 5,995,539 A | * | 11/1999 | Miller | 375/222 |

* cited by examiner

*Primary Examiner*—Paul R. Myers
*Assistant Examiner*—Raymond N Phan

(57) ABSTRACT

An information transfer apparatus including an information source connected to an information to constant frequency converter, a transmitter connected to the information to constant frequency converter, a receiver linked to the transmitter, and a constant frequency interpreter connected to the receiver.

22 Claims, 5 Drawing Sheets

METHOD AND APPARATUS FOR TRANSFERRING INFORMATION USING A CONSTANT FREQUENCY

FIELD OF THE INVENTION

This invention relates to transferring information and more specifically to transferring status information by transmitting one of a number of predetermined frequencies.

BACKGROUND

Electronic systems typically generate and process enormous amounts of information which must be transferred about inside and outside the system. Many bus architectures exist for transferring information. For example, parallel and serial data buses are used to transfer information encoded as digital binary numbers, requiring microprocessors or extensive electrical circuits to generate, transmit, and decode the information. When the information to be transferred is less diverse, a number of dedicated status lines may be used, each assigned to transfer a single particular bit of information. However, these solutions require many electrical components and electrical conductors, thus adding to the cost, complexity, and unreliability of the system.

For example, complex electronic systems are frequently designed with relatively simple modular components. This makes testing and repair simpler and cheaper, as well as aiding the design process. Electronic modules are connected together to add functionality or redundancy to the overall system. In a well designed modular electronic system, faulty modules can often be replaced while the system is running, without interfering with system operation.

Information typically must be transferred between modules, such as status information which may be collected by a single part of the system to be presented to the user. Modules such as power supplies, which are designed to be as simple and reliable as possible, transfer a relatively limited amount of information to other modules. The total information to be transferred may consist of indicating which of a few possible states the module is in. A microprocessor based messaging system for transferring information from the module may be more likely to fail than the rest of the module. Likewise, using a number of dedicated status lines to transfer information, particularly for a removable module, would increase the likelihood of a bad connection, leading to failure. These and other disadvantages make previous methods of transferring information in an electronic system inadequate for many purposes.

SUMMARY

The inventors have devised a system for transferring information across a single electrical conductor or transmission medium without requiring a complex bus architecture.

Thus, the invention may comprise a method of transferring information. The method includes converting the information to a constant frequency wherein the information is represented by the constant frequency, transmitting the constant frequency, and interpreting the constant frequency to recover the information.

The invention may also comprise an information transfer apparatus including an information source connected to an "information to constant frequency converter," a transmitter connected to the information to constant frequency converter, a receiver linked to the transmitter, and a constant frequency interpreter connected to the receiver.

The invention may also comprise an information transfer apparatus. The apparatus includes an electronic device having a plurality of digital outputs, each of the plurality of digital outputs dedicated to carrying a particular predetermined bit of information. The apparatus also includes a presettable binary counter having a clock input, a plurality of preset inputs, and a ripple carry output. The plurality of digital outputs of the electronic device are connected to the plurality of preset inputs of the counter. An oscillator is connected to the clock input of the counter. A computer processor is linked to the ripple carry output of the binary counter. Computer executable program code is associated with said computer processor, including code for measuring a constant frequency from the ripple carry output, and code for comparing the constant frequency with a plurality of frequency ranges to identify which of the plurality of frequency ranges the constant frequency falls within.

BRIEF DESCRIPTION OF THE DRAWING

Illustrative and presently preferred embodiments of the invention are shown in the accompanying drawing, in which.

DESCRIPTION OF THE PREFERRED EMBODIMENTS

Figure 1:
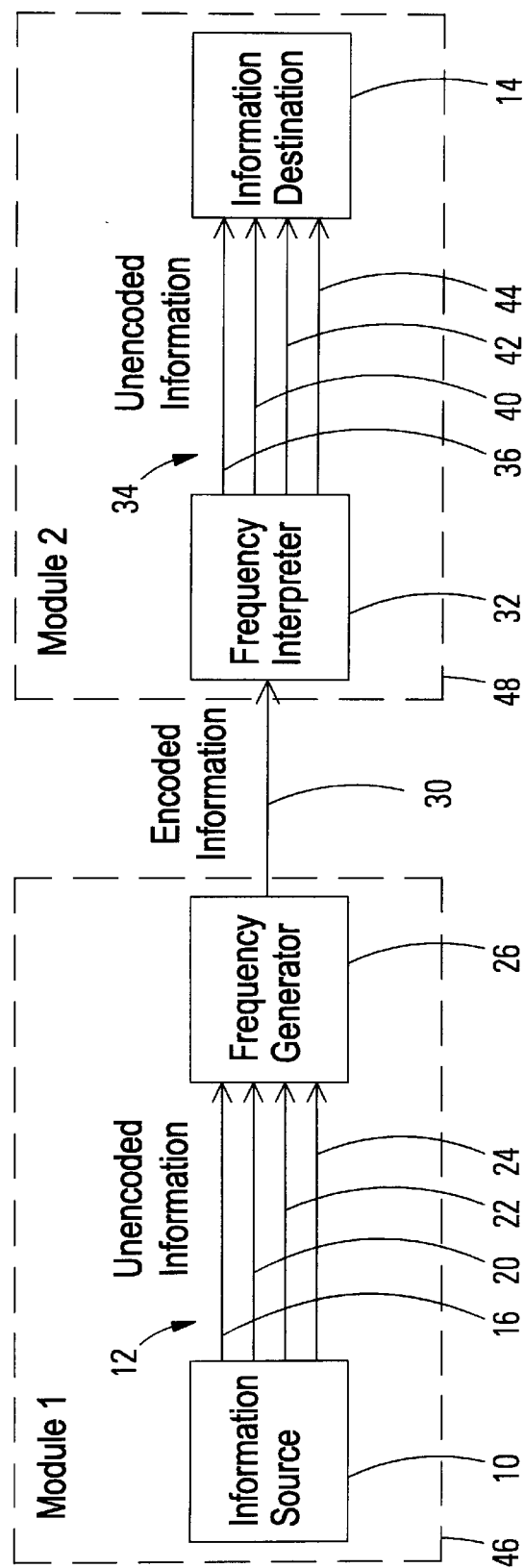
FIG. 1 is an exemplary block diagram of an information source transferring information to an information destination using frequency.

An exemplary electronic system which transfers information using frequency is illustrated in the block diagram of FIG. 1. An information source 10 produces information 12 to be transferred to an information destination 14. The information 12 to be transferred is preferably in digital form, where a bit of information is represented by a one or a zero. The information 12 is also preferably unencoded so that each bit of information is carried on a single dedicated electrical conductor (e.g., 16, 20, 22, and 24), and the digital ones and zeros are represented by two different voltage levels on the electrical conductors 16–24.

A frequency converter 26 converts the unencoded digital information into a specific constant frequency which can be transferred or transmitted throughout the system. Each possible frequency corresponds to a different information state or content. For example, for the exemplary system illustrated in FIG. 1, four bits of information can be carried on the four electrical conductors 16, 20, 22, and 24. The four digital bits can be in any one of sixteen possible states, represented by a 0000, 0001, 0010, up to 1111. Thus, the frequency converter 26 generates one of sixteen frequencies depending upon the state of the unencoded information 12. The generated frequency is preferably a square wave, or a voltage which oscillates between two different levels at regular time intervals. The frequency is preferably constant for each of possible information states, that is, each information state is associated with a single particular frequency. However, as will be discussed in more detail below, the frequencies preferably have large tolerances, thereby reducing the cost of the electrical components required to generate and interpret the frequency. This allows the frequencies to drift within a range or window of detection without introducing errors into the transferred information.

The term frequency refers to how often the voltage level changes in a given time period, such as the number of times the voltage cycles from low to high and back to low in a second. In this example, if the voltage cycles 80 times in a second, the frequency is 80 Hz. However, the method and system for transferring information with frequency is not limited to any particular definition of frequency, as long as the frequency can be generated to represent information and the frequency can be measured.

The constant frequency, or encoded information, is preferably transferred, or transmitted, by an electrical conductor 30. The frequency may alternatively be transferred by any other suitable means, such as a wireless transmission. Note that in the preferred embodiment, a single electrical conductor 30 is shown. This assumes that the various elements in the system share a common ground. If this is not the case, any known method may be used to compensate for the lack of a common ground, such as adding a ground wire between elements, or using a different type of transmission such as via differential signals or a wireless transmission. The frequency can be transmitted between any number of points, in any suitable way, as long as the frequency can be measured at the destination.

A frequency interpreter 32 receives the constant frequency and interprets it, thus restoring the original information 34. The information 34 may then be transmitted to the information destination 14 on four electrical conductors 36, 40, 42, and 44.

Information transfer using frequency facilitates sharing information between parts of an electronic system, such as between remote independent electronic systems, or between modules (e.g., 46 and 48) in a modular electronic system. For example, status information may be transferred from a modular redundant power supply 46 to a processing module 48.

Figure 2:
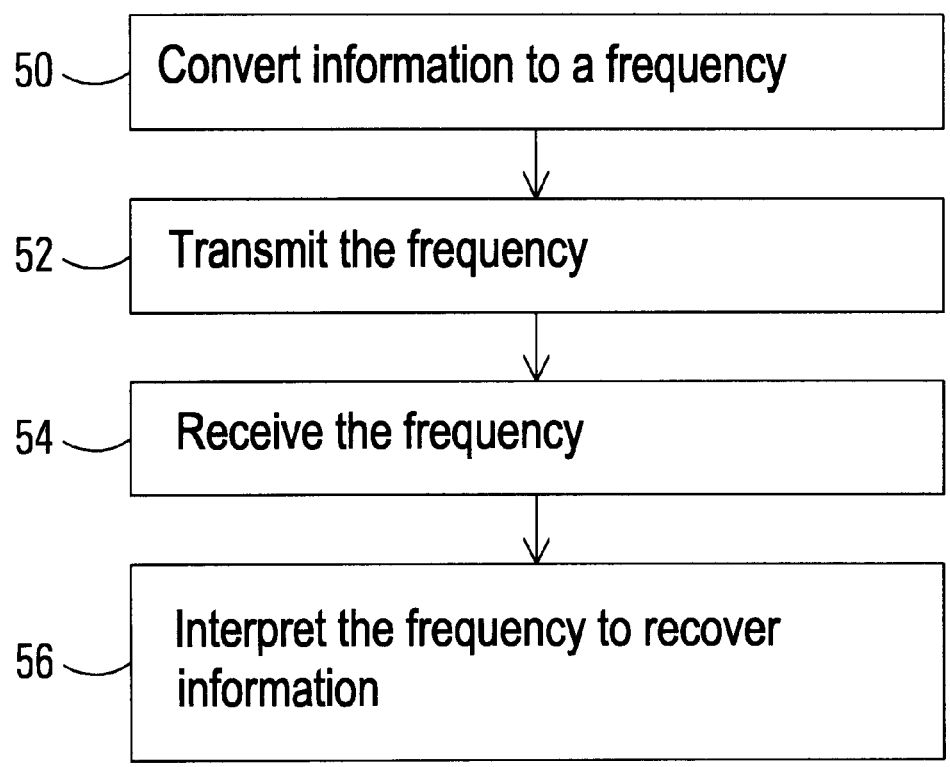
FIG. 2 is a flow chart illustrating an exemplary process of transferring information using frequency.

Referring now to FIG. 2, the process of transferring information using frequency includes converting 50 the information to a frequency and transmitting 52 the frequency. The frequency is received 54 at its destination, and the information is interpreted 56 to recover the original information.

Information transfer using frequency is particularly well suited to systems which require simplicity and a minimal number of conductors or transmission paths. In the exemplary electronic system of FIG. 1, adding a complex microprocessor based messaging system to the modular redundant power supply 46 to transfer status information to the processing module 48 would greatly increase the likelihood of failure. Increasing the likelihood of failure by adding a complex microprocessor based messaging system would degrade the purpose of adding a redundant power supply to the modular electronic system. A microprocessor based messaging system would also involve protocol issues which can be difficult and costly to design and debug.

Information transfer using frequency also greatly reduces the number of electrical conductors required between an information source 10 and an information destination 14. In the exemplary electronic system of FIG. 1, it is advantageous to limit the number of conductors between modules. Since the modules are removable, each electrical conductor between modules requires an electrical contact which can be connected and disconnected. This increases the likelihood of short circuits due to bad connections. A limited number of electrical conductors also reduces the size and cost of the module due to electrical connectors or sockets.

Figure 3:
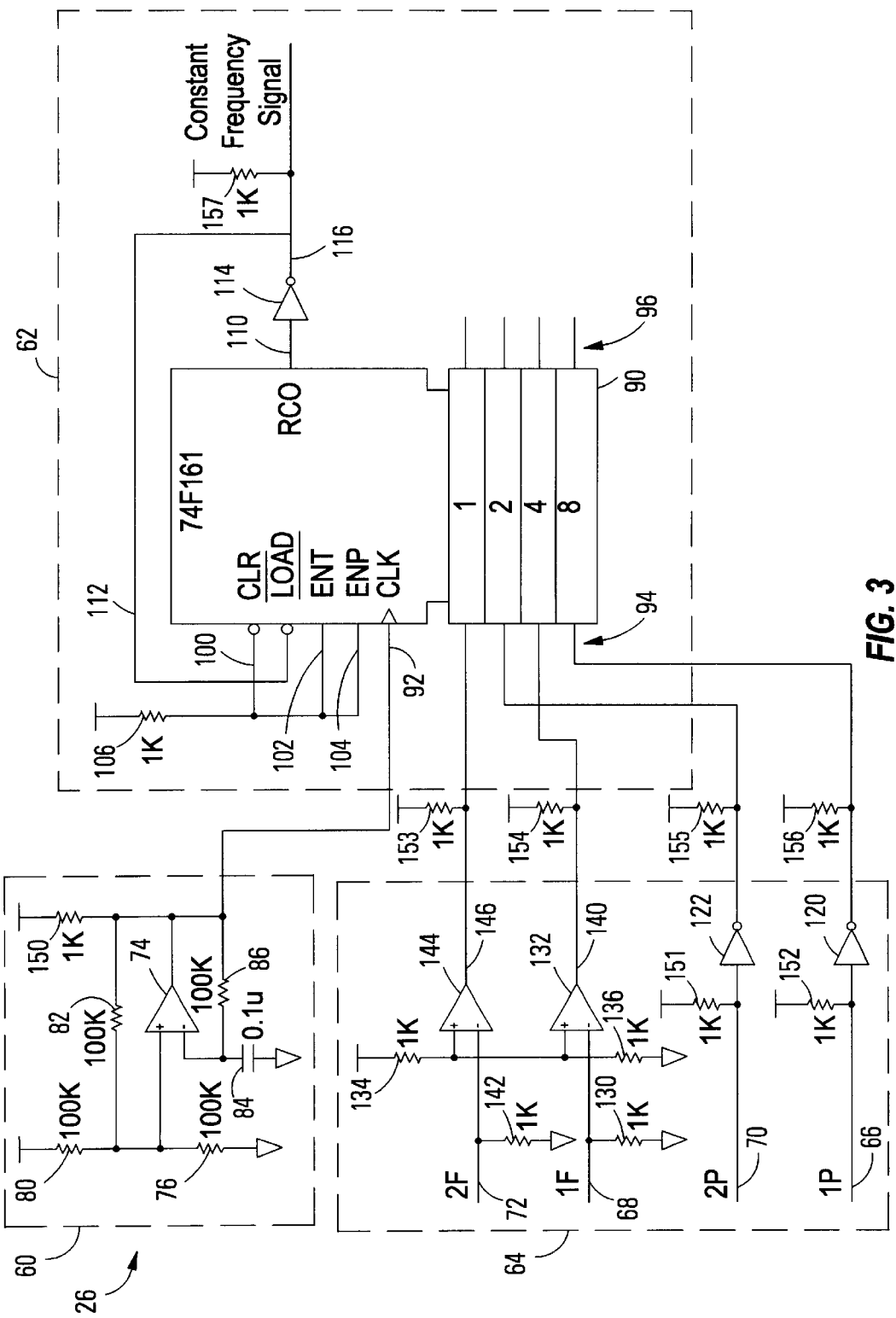
FIG. 3 is a schematic illustration of an exemplary electrical circuit for generating a constant frequency to represent information.

Referring now to FIG. 3, an exemplary electrical circuit for generating a frequency to transfer information will be described. An oscillator 60 generates a base frequency, and a frequency converter 62 combines the information with the base frequency to create a constant frequency to be transmitted. Input signal conditioners 64 may be used to prepare the information before combining it with the base frequency. In this example, two modular redundant power supplies (not shown) each supply two status signals to be transmitted to a processing system (e.g., 48, FIG. 1). These four status signals are used as the inputs to the frequency converter 62 to generate a constant frequency.

The oscillator 60 can be any desired type of oscillator, as long as it is accurate enough to convey the information using frequency without introducing errors due to excessive frequency drift. The frequency tolerance of the oscillator 60 depends upon several factors, such as the number of possible information states and the speed of the frequency interpreter (e.g., 32, FIG. 1). For example, if the number of possible information states is very low, each information state can be assigned a wide frequency range while using a slow oscillator. If the number of possible information states is relatively high, but the frequency interpreter is fast enough to respond to high frequencies, each information state can still be assigned a wide frequency range, using a fast oscillator. These examples would both be suitable for an inexpensive oscillator with a large frequency tolerance. If, however, the number of possible information states is high and the frequency interpreter cannot process high frequencies, a better oscillator would be required so that each information state could be represented by a narrow frequency range. Furthermore, in many cases, only a portion of the possible information states are used, so the required number of frequency ranges is reduced.

In the preferred example, the two modular power supplies create a total of four status lines as inputs to the frequency converter 62, resulting in 16 possible information states. The four status lines are Power Supply 1 Present (1P) 66, Power Supply 1 Fail (1F) 68, Power Supply 2 Present (2P) 70, and Power Supply 2 Fail (2F) 72. However, in this example only five of the possible 16 information states will be interpreted. The inputs 66–72 to the frequency converter 62 can be organized to separate the five interpreted states as widely as possible, thus reducing the frequency tolerance requirements of the oscillator 60, as long as the inputs 66–72 do not enter non-interpreted states whose frequencies would overlap the detection window of the five interpreted states. This means that although each possible information state will produce a different frequency in the preferred exemplary frequency converter 62, the inputs 66–72 may be organized so that the interpreted frequencies are separated by one or more non-interpreted frequencies. If more than one interpreted frequencies are contiguous, it is preferable that they be higher frequencies rather than lower in order to increase the separation percentage, as will be illustrated below. The detection windows of the interpreted frequencies can then be made wide enough to overlap non-interpreted frequencies, making interpretation of the frequencies more likely with a relatively less accurate oscillator 60. The inputs 66–72 can be organized to separate the interpreted frequencies by arranging their order of entry into the frequency converter 62 and by managing the sense (high true or low true) of the digital signals, as will be described in more detail below.

In the preferred example, the oscillator 60 is an astable comparator which generates a base frequency of about 72 Hz. The oscillator 60 uses electrical components having 1% tolerances. This inexpensive oscillator results in an overall frequency tolerance of about 5%. Alternatively, any type of oscillator may be used, such as a crystal oscillator. The oscillator 60 includes an operational amplifier (op amp) 74, such as an LM339 quad comparator available from the National Semiconductor Corporation of Santa Clara, Calif. The non-inverting (+) input of op amp 74 is connected to ground through a first 100 kΩ resistor 76 and to Vcc (5 volts) through a second 100 kΩ resistor 80. The non-inverting input of op amp 74 is also connected to the output of the op amp 74 through a third 100 kΩ resistor 82. The inverting (−) input of op amp 74 is connected to ground through a 0.1 μf capacitor 84. The inverting input of op amp 74 is also connected to the output of the op amp 74 through a fourth 100 kΩ resistor 86.

The op amp 74 outputs a high voltage (5 volts) whenever the voltage at the non-inverting input is higher than that at the inverting input. The op amp 74 outputs a low voltage (ground) whenever the voltage at the non-inverting input is higher than that at the inverting input. When the op amp 74 outputs a high voltage, the voltage at the non-inverting input is ⅔ Vcc due to the voltage divider made up of the first, second and third resistors 76, 80, and 82, respectively, according to the following equation: $Vni=Vcc*R1/(R1+R2)$. In this equation describing a voltage divider, R2 is connected to Vcc, R1 is connected to ground, and R1 and R2 are connected to each other, with Vni being the voltage appearing at the connection between R1 and R2. In this case, R1 is the first resistor 76 and R2 is the parallel combination of the second and third resistors 80 and 82, having a combined resistance of 50 kΩ. Therefore, when the op amp 74 output is high, $Vni=Vcc*100/(50+100)$, or ⅔ Vcc. When the op amp 74 outputs a low voltage, the voltage at the non-inverting input is ⅓ Vcc. In this case, R1 is the parallel combination of the first and third resistors 76 and 82, having a combined resistance of 50 kΩ, and R2 is the second resistor 80. Therefore, when the op amp 74 output is low, $Vni=Vcc*50/(50+100)$, or ⅓ Vcc.

When the op amp 74 output is high, the capacitor 84 is charged through the fourth resistor 86 until the voltage at the inverting input becomes greater than the ⅔ Vcc at the non-inverting input, causing the op amp 74 output to switch to low and setting the voltage at the non-inverting input to ⅓ Vcc. The capacitor 84 then discharges until the voltage at the inverting input becomes lower than the ⅓ Vcc at the non-inverting input of the op amp 74, causing the op amp 74 output to switch back to high and setting the voltage at the non-inverting input back to ⅔ Vcc. This oscillation of the voltage at the op amp 74 output is used as the base frequency for the frequency converter 62.

The base frequency depends upon the time constant (RC) of the oscillator 60, which is equal to the value of the capacitor 84 times the value of the fourth resistor 86, 0.1 μf*100 kΩ, or 0.02. The base frequency is calculated as follows. The voltage (Vc) at the capacitor 84 and the inverting input of the op amp 74 charges exponentially toward a value of Vcc with a time constant τ of RC. This voltage at the time of the transition from low to high at the op amp 74 output is ⅓ Vcc, beginning the charging phase. Therefore, $Vc(t)=Vcc-(Vcc-(⅓)Vcc)e^{(-t/RC)}=Vcc(1-(⅔)e^{(-t/RC)})$. The oscillator 60 changes state at time T1 when Vc(t) just reaches ⅔ Vcc: $(⅔)Vcc=Vcc(1-(⅔)e^{(-T1/RC)})$. Solving for T1 yields $T1=RC*\ln(2)$. Vc then discharges exponentially toward a value of zero volts, with $Vc(t')=(⅔)Vcc*e^{(-t'/RC)}$. The oscillator 60 changes state again at time T2 when Vc(t') just reaches ⅓ Vcc: $(⅓)Vcc=(⅔)Vcc*e^{(-T2/RC)}$. Solving for T2 yields $T2=RC\star\ln(2)$. The total time it takes for the voltage to complete a cycle at the output of the op amp 74 is therefore T1+T2, or $2RC*\ln(2)=2*0.02*0.693=13.8$ ms/cycle. The base frequency is therefore about 1/13.8, or about 72 Hz.

Again, any type of oscillator may be used to generate the base frequency for the frequency converter 62, as long as the frequency tolerance is sufficient to avoid errors in interpreting the frequency generated by the frequency converter 62. However, the oscillator 60 described above is an inexpensive oscillator which meets the requirements of the exemplary electronic system described herein.

As mentioned above, the base frequency generated at the output of the op amp 74 in the oscillator 60 is combined with the information to be encoded by the frequency converter 62 which appears at the inputs 66, 68, 70, and 72. The frequency converter 62 combines the information to be encoded with the base frequency to generate a constant frequency which represents the information.

In the preferred exemplary embodiment, the frequency converter 62 consists of a binary counter 90 or divider which divides the base frequency by the binary number appearing at the inputs 94 to the counter 90. The binary counter 90 may be a 74F161 synchronous four-bit binary counter available from the Texas Instruments corporation of Dallas, Tex. (Wider binary counters, or multiple grouped counters, may be used when more than four digital inputs must be converted to a constant frequency.) The binary counter 90 has a clock input 92 which is connected to the output of the op amp 74 in the oscillator 60. The counter 90 continually counts up from zero to 15, rolling back over to zero each time it reaches 15. The counter 90 increments each time a pulse is received on its clock input 92. The counter 90 can be preset with a number appearing on its four preset inputs 94, causing it to count up from the preset number to 15, at which point it rolls back to the preset number to continue counting.

The four preset inputs 94 on the counter 90 may be connected directly to the four status lines 66–72, or the status lines 66–72 may be processed before entering the counter 90. In the exemplary frequency converter 62 illustrated in FIG. 3, the status lines 66–72 pass through signal conditioners 64 before entering the counter 90. The 1P 66 and 2P 70 signals are inverted by inverters 120 and 122, respectively, before entering the counter 90. The 1F 68 and 2F 72 signals are converted from a voltage which may be at any level between ground and VCC to a proper digital signal as follows. The 1F 68 signal indicates whether redundant power supply 1 has failed, in which case it will be low or floating. The 1F 68 signal is pulled down toward ground through a 1 kΩ resistor 130 so that if redundant power supply 1 has failed, the 1F 68 signal will be lower than 2.5 volts. If redundant power supply 1 is operating correctly, the 1F 68 signal will be greater than 2.5 volts. The 1F 68 signal is connected to the inverting input of an op amp 132. A reference voltage of 2.5 volts is supplied to the non-inverting input of the op amp 132, created by a voltage divider consisting of two 1 kΩ resistors 134 and 136 connected between Vcc and ground. Therefore, if the voltage on the 1F 68 signal, after being pulled down by resistor 130, is less than 2.5 volts, the output 140 of op amp 132 is high, indicating that redundant power supply 1 has failed. If the voltage on the 1F 68 signal, after being pulled down by resistor 130, is greater than 2.5 volts, the output 140 of op amp 132 is low, indicating that redundant power supply 1 is operating correctly. The output 140 of op amp 132 is connected to one of the four preset inputs 94 of the counter 90.

Similarly, the 2F 72 signal is pulled down toward ground through a 1 kΩ resistor 142 and is connected to the inverting input of an op amp 144. The reference voltage of 2.5 volts, created by the voltage divider consisting of resistors 134 and 136, is supplied to the non-inverting input of the op amp 144. The output 146 of op amp 144 is connected to one of the four preset inputs 94 of the counter 90.

Pullup resistors may be included as needed throughout the circuit. For example, 1 kΩ resistors 150, 151, 152, 153, 154, 155, 156, and 157 are required to pull up the output of components having open collector outputs such as the inverters 114, 120, and 122 and comparators 74, 132, and 144.

Note that in this example, the four status signals 66–72 are active low signals. These active low signals are inverted by the inverters 120 and 122 and the comparators 132 and 144, so the inputs 94 to the counter 90 are active high.

Four counter outputs 96, which indicate the current count of the counter 90, are not needed and are left disconnected. CLR__100, ENT 102, and ENP 104 control inputs on the counter 90 are tied to Vcc through a 1 kΩ resistor 106. A ripple carry output 110 produces a high level pulse each time the count is 15. The LOAD__112 control input is connected to the ripple carry output 110 through an inverter 114, such as a 74F06 hex inverter available from Philips Semiconductors of Sunnyvale, Calif. Each time the count is 15, the ripple carry output 110 produces the high level pulse which is inverted by the inverter 114, pulling the LOAD__112 control input low. Thus, each time the count is 15, the LOAD__112 control input is pulled low, causing the counter 90 to be preset with the value on the four preset inputs 94. Once the counter 90 has the new preset value, the ripple carry output 110 is again low and the count continues.

The inverter 114 also buffers the constant frequency produced by the ripple carry output 110 of the counter 90. The output 116 of the inverter 114 is therefore used as the source of the constant frequency signal which is transferred as desired throughout the electronic system.

The counter 90 divides the base frequency from the oscillator 60 based on the number appearing at the four preset inputs 94. The constant frequency appearing at the ripple carry output 110 of the counter 90 is equal to the base frequency divided by 16 minus the number at the preset inputs 94, as follows: Fc=72 Hz/(16-preset). For example, if the preset number were 14, the constant frequency would be 72 Hz/(16–14), or 36.1 Hz. The following table gives the constant frequencies generated by the frequency generator 26 which will be interpreted:

| Condition | Freq (Hz) | Counter Preset Inputs (1P, 1F, 2P, 2F) | |
|---|---|---|---|
| No redundant supplies | 0 | N/A | |
| Power supply 1 missing | 5.2 | 0, 0, 1, 0 | 2 |
| Power supply 2 missing | 9.1 | 1, 0, 0, 0 | 8 |
| All OK | 12.1 | 1, 0, 1, 0 | 10 |
| Power supply 2 fault | 14.5 | 1, 0, 1, 1 | 11 |
| Power supply 1 fault | 36.1 | 1, 1, 1, 0 | 14 |

Note that optional circuitry (not shown) can be added to the frequency converter 62 to ground the output 116 of the inverter 114 so that no constant frequency is transferred, thereby adding an information state without adding another constant frequency, as with the 'No redundant supplies' condition in the table above.

Note also that the four preset inputs 94 to the counter 90 have been arranged so that each constant frequency is separated by at least 10% from its nearest neighbor. In this case, the closest frequencies are 12.1 Hz and 14.5 Hz, which have a separation of 19.8%. If two interpreted numbers for the preset inputs 94 were 4 and 5, the resulting constant frequencies would be 6.03 Hz and 6.57 Hz, having a separation of only 9.1%. As discussed above, frequency separation can be managed by arranging the order of the signals connected to the preset inputs 94, by inverting the signals as necessary, by careful selection of which states will be interpreted versus those which will never occur, and by placing contiguous numbers in higher frequencies rather than lower.

Figure 4:
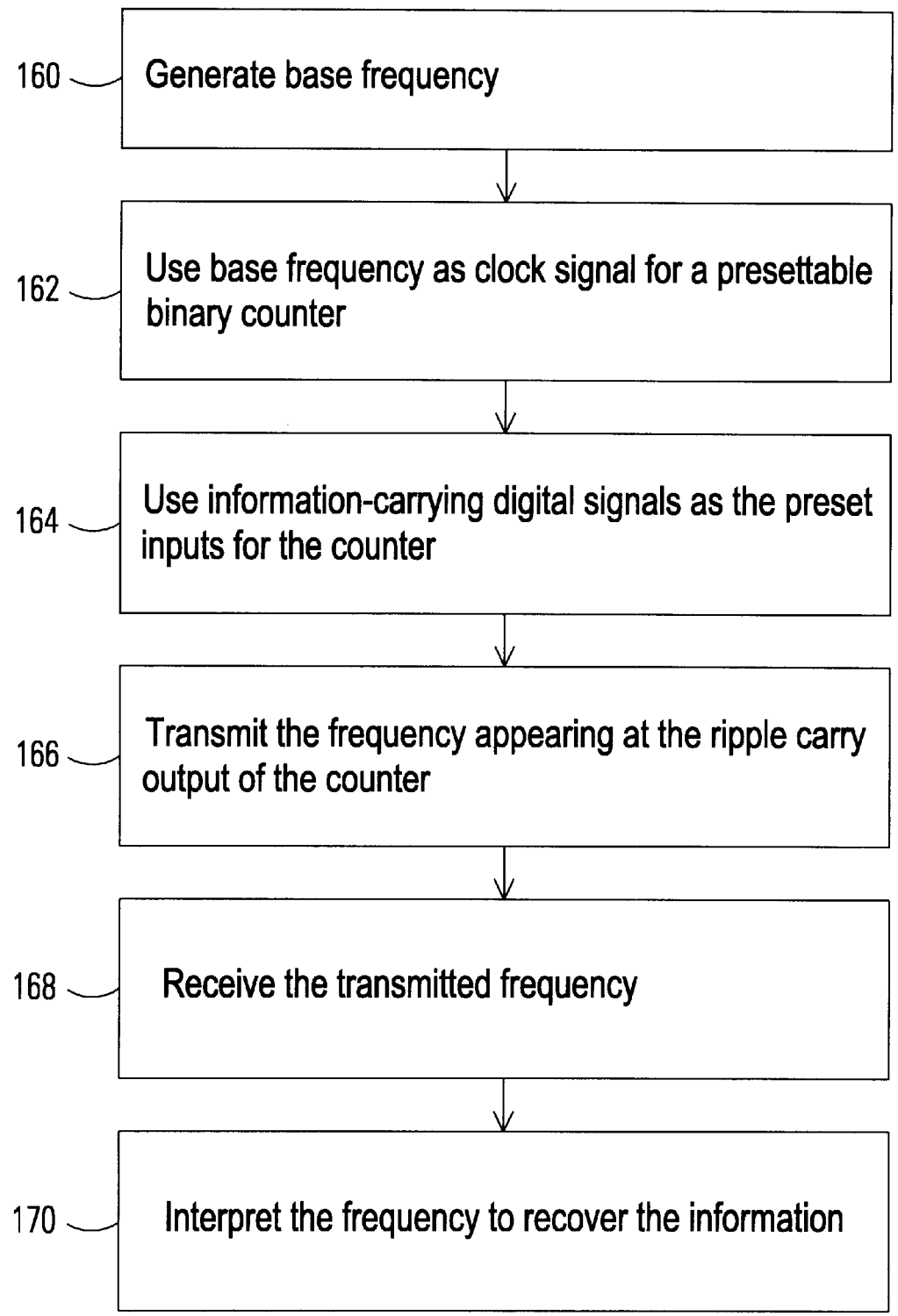
FIG. 4 is a flow chart illustrating the operation of the exemplary electrical circuit of FIG. 3.

The operation of the frequency generator 26 and the frequency interpreter (e.g., 32, FIG. 1) is summarized in the flow chart of FIG. 4. A base frequency is generated 160 which is used 162 as the clock signal for a presettable binary counter. Information-carrying digital signals are used 164 as the preset inputs for the counter, and the constant frequency appearing at the ripple carry output of the counter is transmitted 166 as desired. The transmitted frequency is received 168, and the constant frequency is interpreted 170 to recover the original information.

As discussed above, the constant frequency can be transmitted between any number of points, whether in a single electronic system or remote systems. Similarly, the one-way information transfer system described herein can be duplicated to send information back and forth between two points. The constant frequency can be transmitted in any suitable fashion, such as across one or more electrical conductors or across a wireless connection. Accordingly, the constant frequency can be received by any suitable receiver.

Once received, the constant frequency is interpreted to recover the original information by measuring the constant frequency, then comparing it with a group of constant frequencies to determine what information state or content produced the constant frequency. The frequency interpreter (e.g., 32, FIG. 1) can be any apparatus which can measure the constant frequency and compare it with possible constant frequencies or otherwise retrieve the original information from the transmitted constant frequency. For example, the frequency interpreter may consist of a frequency meter and a gate array or other programmable logic device which compares the measured constant frequency with the possible constant frequencies. Alternatively, a mathematical algorithm could be used to retrieve the information based on the measured frequency.

In the preferred exemplary embodiment, the frequency interpreter (e.g., 32, FIG. 1) is a processor such as any microcontroller or microprocessor which can operate rapidly enough to count the constant frequency and retrieve the original information. The processor measures the constant frequency by periodically sampling the state of the signal carrying the constant frequency. The processor counts the number of edge transitions, or voltage changes, which occur on the constant frequency signal during a given time period, thus measuring the constant frequency. The processor then compares the constant frequency with the possible constant frequencies to retrieve the original information used to generate the constant frequency. The processor preferably compares the constant frequency with a set of frequency ranges or windows so that slight variations in the constant frequency will not introduce errors.

The following exemplary program code may be executed by a computer processor to measure the constant frequency generated by the frequency generator 26 described above, and to retrieve information from the constant frequency. The constant frequency is provided to the computer processor on any suitable input, such as a digital input/output port. The software can then read the state of the constant frequency signal by accessing a pointer, such as the 'frequency_input' pointer in the function below.

```
/ ********************************************************** /
/* General definitions
        ==================
        Possible values for the power supply status */
#define PSU_NO_REDUNDANCY       0
#define PSU_LOW_UNKNOWN         1
#define PSU_PS1_MISSING         2
#define PSU_PS2_MISSING         3
#define PSU_ALL_OK              4
#define PSU_PS2_FAULT           5
#define PSU_PS1_FAULT           6
#define PSU_HIGH_UNKNOWN        7
#define PSU_UNDEFINED           8
/* Timer interrupt routine   (This code runs every 10
    milliseconds) */
static Word psu_signal_timer = 99;   /* 100 * 10 mS = 1
    second */
static Boolean psu_signal_was_high; /* edge detection */
static Word psu_edges = 0;           /* sum of rising and
        falling edges seen in 1 second */
/* count both rising and falling edges */
if ( psu_signal_was_high)
{
    /* look at digital input */
    if ( !frequency_input)
    {
        /* signal is now low - just seen falling edge */
        psu_signal_was_high = FALSE;
        psu_edges++;
    }
}
else
{   /* signal was low */
    if (frequency_input)
    {
        /* signal is now high - just seen rising edge */
        psu_signal_was_high = TRUE;
        psu_edges++;
    }
}
if (psu_signal_timer > 0)
    psu_signal_timer--;
else
{
    /* 1 second just elapsed - use 'psu_edges' to find
    Power Supply Detect states */
```

| /* Freq (Hz) | State | Edges | Mid-point |
|---|---|---|---|
| ** | | | 2 |
| ** 0.0 | 'old' single PSU | 0 or 1 | |
| ** | | | 8 |
| ** 5.2 | PS1 missing | 10 or 11 | |
| ** | | | 15 |
| ** 9.1 | PS2 missing | 19 or 20 | |
| ** | | | 22 |
| ** 12.1 | All OK | 24 or 25 | |
| ** | | | 27 |
| ** 14.5 | PS2 fault | 29 or 30 | |
| ** | | | 50 |
| ** 36.1 | PS1 fault | 72 or 73 | |
| ** | | | 85 |

```
*/
    if (psu_edges < 2)
        psu_state = PSU_NO_REDUNDANCY;
    else if (psu_edges < 8)
        psu_state = PSU_LOW_UNKNOWN;
    else if (psu_edges < 15)
        psu_state = PSU_PS1_MISSING;
```

-continued

```
    else if (psu_edges < 22)
        psu_state = PSU_PS2_MISSING;
    else if (psu_edges < 27)
        psu_state = PSU_ALL_OK;
    else if (psu_edges < 50)
        psu_state = PSU_PS2_FAULT;
    else if (psu_edges < 85)
        psu_state = PSU_PS1_FAULT;
    else
        psu_state =PSU_HIGH_UNKNOWN;
    /* reinitialise for next time around */
    psu_edges = 0;
    psu_signal_timer = 99;   /* 100 * 10 mS = 1 sec */
}
/* end psu detect code */
/ ********************************************************** /
```

The function listed above, written in the C computer programming language, is executed by the processor once every 10 milliseconds, or 100 times per second. It is preferably called by a timer interrupt routine, meaning that a timer in the processor is configured to interrupt the processor every 10 milliseconds to execute the function. The function measures the constant frequency which is referenced by the 'frequency_input' pointer. If the processor interprets more than one constant frequency from various sources, a similar function should be executed to interpret each of the received constant frequencies, or the function may be modified to process multiple constant frequencies.

The function measures the constant frequency by counting both the rising and falling edges using the 'psu_signal_was_high' and 'psu_edges' variables. The total number of edges detected during a one second time period will be roughly equal to twice the constant frequency.

To ensure a one second measurement period, the 'psu_signal_timer' is first initialized with a value of 99. This variable is then decremented each time the function is executed, thereby counting down from 99 to zero. Since the function is executed 100 times per second, when the 'psu_signal_timer' variable has counted down from 99 to zero, one second will have elapsed since the variable was initialized.

When the 'psu_signal_timer' varable reaches zero, the total number of edges detected is compared with the possible frequency ranges for the constant frequency to retrieve the information which was used to generate the constant frequency. As the comments in the code above indicate, the midpoint between each of the possible frequencies is determined. Each frequency range, or window, spans the frequencies between consecutive midpoints. For example, to detect a constant frequency of 9.1 Hz, either 19 or 20 edges should be counted. The next lowest frequency is 5.2 Hz, for which either 10 or 11 edges should be counted. Thus, the midpoint between the 5.2 Hz and 9.1 Hz frequencies would be at 15 edges. The next highest frequency is 12.1 Hz, for which either 24 or 25 edges should be counted. Thus, the midpoint between the 9.1 Hz and 12.1 Hz frequencies would be at 22 edges. Therefore, if the number of edges counted is between 15 and 21, the constant frequency is determined to be 9.1 Hz. An If-Then-Else chain is implemented in the code above comparing the number of edges counted ('psu_edges') with the various edge count ranges. A 'psu_state' variable is then assigned a value according to the information which was used to generate the constant frequency. For example, as discussed above, a constant frequency of 9.1 Hz is generated by the frequency generator 26 if redundant power supply 2 is missing. If the number of edges counted by the processor in one second is between 15 and 21, indicating a constant frequency of 9.1 Hz, the 'psu_state' variable is assigned the 'PSU_PS2_MISSING' value.

The processor may then use the retrieved information in any desired fashion, such as transferring the unencoded information to an information destination (e.g., 14, FIG. 1) like a monitor. For example, the following function can be used to display the status of the two redundant power supplies which was transferred using frequency.

```
/ ******************************************************* /
    switch( psu_state )
    {
        case PSU_NO_REDUNDANCY :
            fpxprint( "x2Redundant supplies not present");
        break;
        case PSU_LOW_UNKNOWN :
            fpxprint( "x2Status unknown");
        break;
        case PSU_PS1_MISSING :
            fpxprint( "x2Power Supply 1 missing");
        break;
        case PSU_PS2_MISSING :
            fpxprint( "x2Power Supply 2 missing");
        break;
        case PSU_ALL_OK :
            fpxprint( "x2Both Power Supplies healthy");
        break;
        case PSU_PS2_FAULT :
            fpxprint( "x2Power Supply 2 FAULT");
        break;
        case PSU_PS1_FAULT :
            fpxprint( "x2Power Supply 1 FAULT");
        break;
        case PSU_HIGH_UNKNOWN :
            fpxprint( "x2Status unknown!");
        break;
        default :
            fpxprint( "x2Status unknown!!");
        break;
    }
/ ******************************************************/
```

Again, the two functions above interpret and display information contained in one constant frequency from a single source. The functions may be duplicated or altered as is known in the art to interpret and use information contained in constant frequencies from multiple sources.

Figure 5:
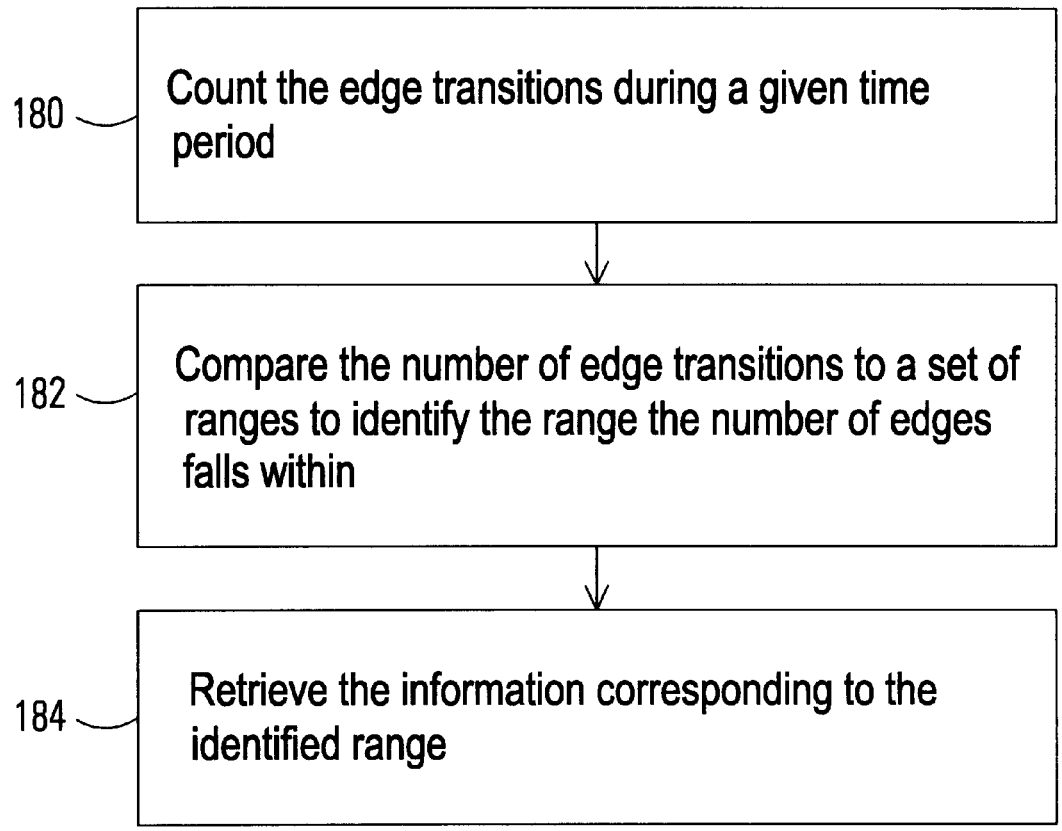
FIG. 5 is a flow chart illustrating an exemplary method of retrieving information from a frequency.

The operation of the exemplary frequency interpreter (e.g., 32, FIG. 1) is summarized in the flow chart of FIG. 5. The frequency interpreter 32 counts 180 the number of edge transitions occurring during a given time period in the constant frequency signal. The resulting number of edge transitions is compared 182 with a set of ranges to identify the range the number of edges falls within. The information corresponding to the identified range is then retrieved 184.

Transferring information using frequency, as described above, can greatly benefit many electronic systems by distributing information with simple frequency generation and interpretation devices and a minimal number of conductors.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of transferring information, comprising:
converting said information to a constant frequency wherein said information is represented by said constant frequency;
transmitting said constant frequency; and
interpreting said constant frequency to recover said information using computer executable program code for measuring said constant frequency and comparing said constant frequency with a plurality of frequency ranges to identify which of said plurality of frequency ranges said constant frequency falls within.

2. The method of claim 1, wherein said converting said information comprises generating one of a plurality of constant frequencies, said information having a given number of states, each of said plurality of constant frequencies being associated with a unique one of said given number of states.

3. The method of claim 1, wherein said converting said information comprises:
generating a base frequency; and
combining said information with said base frequency to form said constant frequency.

4. The method of claim 3, wherein said combining said information with said base frequency comprises:
generating a binary number representing said information; and
dividing said base frequency by said binary number to form said constant frequency.

5. The method of claim 4, wherein said information contains a plurality of possible states, the method further comprising arranging said information to increase spacing between a plurality of constant frequencies formed by a plurality of possible binary numbers representing said plurality of possible states.

6. The method of claim 3, wherein said combining said information with said base frequency comprises:
generating a binary number representing said information;
presetting a binary counter with said binary number; and
providing said base frequency as a clock signal to said binary counter, so that said constant frequency is produced on a ripple carry output of said binary counter.

7. The method of claim 3, wherein said generating a base frequency comprises using an astable comparator to produce said base frequency.

8. The method of claim 1, wherein said interpreting said constant frequency comprises:
identifying said constant frequency; and
comparing said constant frequency with a plurality of frequency ranges, each of said frequency ranges being associated with a particular information content, to determine which of said particular information contents corresponds to said constant frequency.

9. The method of claim 8, wherein said identifying said constant frequency comprises counting a number of edge transitions in a given time period.

10. The method of claim 1, wherein said constant frequency comprises a digital electrical signal.

11. The method of claim 1, wherein said constant frequency comprises a square wave.

12. An information transfer apparatus, comprising:
an information source;
an information to constant frequency converter connected to said information source;
a transmitter connected to said information to constant frequency converter;
a receiver linked to said transmitter; and
a constant frequency interpreter connected to said receiver, said constant frequency interpreter comprising computer executable program code for measuring said constant frequency and comparing said constant frequency with a plurality of frequency ranges to identify which of said plurality of frequency ranges said constant frequency falls within.

13. The information transfer apparatus of claim 12, further comprising a plurality of digital signals connecting said information source to said information to constant frequency converter, wherein each of said plurality of digital signals is dedicated to transmitting a single bit of information.

14. The information transfer apparatus of claim 13, wherein said plurality of digital signals comprise status signals.

15. The information transfer apparatus of claim 12, wherein said information source comprises a power supply.

16. The information transfer apparatus of claim 12, wherein said information to constant frequency converter comprises an oscillator and a frequency divider.

17. The information transfer apparatus of claim 16, wherein said frequency divider comprises a binary counter.

18. The information transfer apparatus of claim 17, wherein said binary counter comprises a ripple carry output connected to said transmitter.

19. The information transfer apparatus of claim 12, wherein said constant frequency interpreter comprises a frequency meter and a frequency comparator.

20. An information transfer apparatus, comprising:
an information source;
an information to constant frequency converter connected to said information source;
transmitter connected to said information to constant frequency converter;
a receiver linked to said transmitter; and
a constant frequency interpreter connected to said receiver, wherein said constant frequency interpreter comprises computer executable program code, said code comprising:
code for measuring a constant frequency produced by said information to constant frequency converter; and
code for comparing said constant frequency with a plurality of frequency ranges to identify which of said plurality of frequency ranges said constant frequency falls within.

21. An information transfer apparatus, comprising:
an electronic device having a plurality of digital outputs, each of said plurality of digital outputs dedicated to carrying a particular predetermined bit of information;
an oscillator;
a presettable binary counter having a clock input, a plurality of preset inputs, and a ripple carry output, said plurality of digital outputs of said electronic device being connected to said plurality of preset inputs, said oscillator being connected to said clock input;
a computer processor linked to said ripple carry output of said binary counter; and
computer executable program code associated with said computer processor, said code comprising:
code for measuring a constant frequency from said ripple carry output; and
code for comparing said constant frequency with a plurality of frequency ranges to identify which of said plurality of frequency ranges said constant frequency falls within.

22. An apparatus for transferring information, comprising:
means for converting said information to a constant frequency wherein said information is represented by said constant frequency;
means for transmitting said constant frequency; and
means for interpreting said constant frequency to recover said information, said means for interpreting comprising computer executable program code, said code comprising:
code for measuring said constant frequency; and
code for comparing said constant frequency with a plurality of frequency ranges to identify which of said plurality of frequency ranges said constant frequency falls within.

* * * * *